United States Patent
Tam et al.

(10) Patent No.: US 9,208,527 B2
(45) Date of Patent: Dec. 8, 2015

(54) GENERAL LEDGER (GL) JOURNAL DELETE/ACCOUNTING LINE REVERSAL WEB SERVICE

(75) Inventors: Wansan Tam, Daly City, CA (US); Qing Du, Pleasanton, CA (US); Chi Ken Yeung, San Ramon, CA (US); Jason Aron Alonzo, Fair Oaks, CA (US); Kottresh Kogali, Pleasanton, CA (US); Amarnath Molugu, Hyderabad (IN); Simran Sawhney, Hyderabad (IN); Arjun Hegde, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1274 days.

(21) Appl. No.: 12/697,509

(22) Filed: Feb. 1, 2010

(65) Prior Publication Data

US 2011/0191214 A1    Aug. 4, 2011

Related U.S. Application Data

(60) Provisional application No. 61/299,894, filed on Jan. 29, 2010.

(51) Int. Cl.
*G07F 19/00* (2006.01)
*G06Q 40/00* (2012.01)

(52) U.S. Cl.
CPC ........................................ *G06Q 40/12* (2013.01)

(58) Field of Classification Search
USPC ........................................................ 705/30
See application file for complete search history.

(56) References Cited

U.S. PATENT DOCUMENTS

| | | | |
|---|---|---|---|
| 6,058,375 A * | 5/2000 | Park | 705/30 |
| 6,085,173 A * | 7/2000 | Suh | 705/30 |
| 6,442,533 B1 * | 8/2002 | Hinkle | 705/36 R |
| 6,532,450 B1 * | 3/2003 | Brown et al. | 705/40 |
| 6,584,453 B1 * | 6/2003 | Kaplan et al. | 705/39 |
| 6,684,384 B1 | 1/2004 | Bickerton et al. | |
| 6,901,440 B1 * | 5/2005 | Bimm et al. | 709/223 |
| 7,117,172 B1 * | 10/2006 | Black | 705/35 |
| 7,120,597 B1 * | 10/2006 | Knudtzon et al. | 705/30 |
| 7,266,570 B2 * | 9/2007 | Cahill et al. | 1/1 |
| 7,340,421 B1 * | 3/2008 | Marcial et al. | 705/30 |
| 7,599,865 B2 * | 10/2009 | Hahn et al. | 705/30 |
| 7,693,759 B2 * | 4/2010 | Alberti et al. | 705/30 |
| 7,761,357 B2 * | 7/2010 | Yu et al. | 705/35 |
| 2002/0111891 A1 * | 8/2002 | Hoffman et al. | 705/36 |
| 2002/0138376 A1 * | 9/2002 | Hinkle | 705/30 |
| 2002/0143862 A1 * | 10/2002 | Peterson | 709/203 |

(Continued)

OTHER PUBLICATIONS

Jledger, *Road Map*, http://jlense.sourceforge.net/roadmap.html, 5 pages, p. 1.

(Continued)

*Primary Examiner* — Ashford S Hayles
(74) *Attorney, Agent, or Firm* — Kilpatrick Townsend & Stockton LLP

(57) ABSTRACT

A web service for automatically determining accounting entries that are affected by the deletion of a journal, formulating reverse accounting entries, and sending the reverse entries back to the source system is described. The service can use transaction identification keys to map and track which accounting entries are affected by the deletion of the journal. The web service can use extensible markup language (XML) among other formats.

20 Claims, 7 Drawing Sheets

(56) References Cited

U.S. PATENT DOCUMENTS

| | | | |
|---|---|---|---|
| 2002/0152142 A1* | 10/2002 | Schellmann et al. | 705/30 |
| 2003/0040988 A1* | 2/2003 | Ha et al. | 705/30 |
| 2003/0050876 A1* | 3/2003 | Tawara et al. | 705/30 |
| 2003/0131008 A1* | 7/2003 | Paulin | 707/100 |
| 2003/0172013 A1* | 9/2003 | Block et al. | 705/33 |
| 2003/0204458 A1* | 10/2003 | Carroll et al. | 705/35 |
| 2004/0111342 A1 | 6/2004 | Wang | |
| 2005/0038721 A1* | 2/2005 | Goeckel et al. | 705/30 |
| 2005/0044015 A1* | 2/2005 | Bracken et al. | 705/30 |
| 2005/0055250 A1* | 3/2005 | Kopold et al. | 705/4 |
| 2005/0098623 A1* | 5/2005 | Kim | 235/380 |
| 2005/0171873 A1* | 8/2005 | Alberti et al. | 705/30 |
| 2005/0177471 A1* | 8/2005 | Crossett et al. | 705/30 |
| 2005/0246250 A1 | 11/2005 | Murray | |
| 2005/0256789 A1* | 11/2005 | Matsuoka | 705/30 |
| 2005/0278580 A1* | 12/2005 | Breitling et al. | 714/39 |
| 2005/0278587 A1* | 12/2005 | Breitling et al. | 714/48 |
| 2006/0190365 A1* | 8/2006 | Stewart et al. | 705/30 |
| 2006/0235773 A1* | 10/2006 | Nelson et al. | 705/30 |
| 2006/0253333 A1* | 11/2006 | Magarian et al. | 705/24 |
| 2007/0106705 A1* | 5/2007 | Chalana | 707/201 |
| 2007/0136155 A1* | 6/2007 | Chape et al. | 705/30 |
| 2007/0156835 A1* | 7/2007 | Pulkowski et al. | 709/207 |
| 2007/0179870 A1* | 8/2007 | Goodbody et al. | 705/30 |
| 2008/0010198 A1 | 1/2008 | Eliscu | |
| 2008/0140692 A1* | 6/2008 | Gehring | 707/101 |
| 2009/0070241 A1* | 3/2009 | Manohar | 705/30 |
| 2009/0132612 A1* | 5/2009 | Bruening et al. | 707/203 |
| 2009/0172035 A1* | 7/2009 | Lessing et al. | 707/104.1 |
| 2009/0187496 A1* | 7/2009 | Edens | 705/30 |
| 2009/0204515 A1* | 8/2009 | Zwiebach | 705/30 |
| 2009/0204517 A1* | 8/2009 | Edens et al. | 705/30 |
| 2010/0125471 A1* | 5/2010 | Wang et al. | 705/7 |
| 2010/0138269 A1* | 6/2010 | Cirpus et al. | 705/9 |
| 2010/0250409 A1* | 9/2010 | Savage et al. | 705/30 |
| 2010/0306089 A1* | 12/2010 | Gelerman | 705/30 |
| 2013/0332325 A1* | 12/2013 | Loehden et al. | 705/30 |

OTHER PUBLICATIONS

"Can a Service-oriented Architecture Hinder Sarbanes-Oxley Compliance Efforts?" http://www.theiia.org/intAuditor/itaudit/archives/2006/october/can-a-service-oriented-architecture-hinder-sarbanes-oxley-compliance-efforts/, 4 pages, p. 2.

General Ledger in Microsoft Dynamics GP, http://download.microsoft.com/download/4/8/b/48b97da3-be8f-4859-ab26-f4f078b74345/GP_GeneralLedger.pdf, 4 pages, p. 1.

General Ledger for Windows, http://www.activant.com/documents/products/datasheets/ACT_general_Ledger_DS.pdf, 2 pages, p. 1.

\* cited by examiner

Transaction ID:   0588JF192500017    402

FIG. 4

| Transaction Type | Type_J |
|---|---|
| Sequence Number | 0001 |
| Date | Jan. 30, 2010 |

GENERAL LEDGER (GL) JOURNAL DELETE/ACCOUNTING LINE REVERSAL WEB SERVICE

CROSS-REFERENCES TO RELATED APPLICATIONS

This application claims the benefit of U.S. Provisional Application No. 61/299,894, filed Jan. 29, 2010, hereby incorporated by reference in its entirety for all purposes.

BACKGROUND

1. Field of the Invention

The present disclosure relates generally to the field of data processing for accounting data. Specifically presented are methods and systems for formulating reverse accounting entries to account for journal entries in a deleted journal using a web service.

2. Description of the Related Art

In accounting, a "general ledger" (GL) is one of the main financial records of a business. The general ledger includes more or less all of the accounts which are reported on the business' financial statements, such as cash, accounts payable, and expense accounts. Each ledger in the general ledger typically keeps a balance, or the running total of money, in each account for which the business wishes to track.

Large enterprises often have complex financial systems to track their general ledgers, including accounting entries. Oftentimes these systems are composed of more than one piece of computer software to facilitate accounting entry or line creation and, ultimately, the posting of the lines to journals. Enterprises may employ, for example, an information technology system that performs specialized tasks specific to the organization or perhaps the industry.

In one example, a specialized system such as a Financials Accounting Hub (FAH) uses a rules-based engine to create accounting line transactions for numerous other specialized source systems. Entities in the financials services industry utilize the financials accounting hub to aggregate source transaction information from other specialized systems that handle insurance claims, retail banking, online banking, brokerage transactions, etc. To continue the transaction flow, the accounting lines that are created from the financials accounting hub could then be sent to an Enterprise Resource Planning (ERP) General Ledger (GL) system, such as PeopleSoft® Enterprise General Ledger, that processes the accounting lines and creates journals.

Often, a program within the ERP GL system takes the accounting lines generated by the financials accounting hub and utilizes the existing ERP GL setup and configuration to validate the accounting lines. For example, for the accounting lines to be properly processed into journals, they should balance, be accounted for in open periods, and have a valid combination of the chart of accounts.

In some more advanced implementations of these systems, systems integrators may build customized solutions between the numerous systems to synchronize the master ERP GL setup data to the financials accounting hub to ensure that the accounting entries that are created are valid. However even in the fastest and most sophisticated systems, the setup data can have some latency in being synchronized across the systems. Also, the setup data risk being modified in the ERP GL system prior to the journal being posted.

One example of where discrepancies can enter the system is if an accounting period is closed in the ERP GL after the transaction is accounted and transferred from the financials accounting hub—but before posting in PeopleSoft® General Ledger. Thus, it may be necessary to delete the journal in order to, in effect, remove the journal that is not valid.

In such a case the financials accounting hub, or the system that creates accounting lines from source systems, often needs to be corrected. Each accounting line may need to be modified to fall into an open period because the period of the existing accounting lines has been closed. In order to accomplish such a task, an accounting clerk typically manually identifies all of the source accounting entries in one system such as the financials accounting hub, that correspond to the journal requiring correction in the other system, such as the PeopleSoft® General Ledger. This can be a manually arduous task to identify all of the original transactions that are associated with this journal. After the accounting clerk analyzes the journal and manually records the details from the GL ERP that identify the source transaction, the clerk then leaves the GL ERP and logs in to the financials accounting hub. At this point the clerk typically needs to identify the manually-noted incorrect accounting entries and create manual transactions that reverse the previously integrated accounting entries. This process is followed so that audit trails are maintained.

Accounting entries often cannot simply be removed from the system. Reversal or deleting of GL journals are not automatically coordinated with the reversal of sub-ledger accounting entries. This is error-prone and increases the possibility of accounting data being lost or unaccounted for. Additionally, reversing the accounting entries to net to zero with the original lines with an incorrect accounting period would commonly need to be marked for sending to the ERP GL. Once the accounting entries have been corrected and the original lines netted to zero, the accounting clerk could add new accounting lines to again be sent to the ERP GL for the originally intended transaction.

As apparent from the above description, the manual steps that are commonly employed to correct the data from financials account hub are prone to error and can be tedious. An improved method and system for deleting journals and formulating reverse accounting entries is desired.

BRIEF SUMMARY

Embodiments in accordance with the present disclosure relate to a web service or other computerized system that, during a deletion operation of a journal, determines the affected transaction entries and sends reverse accounting entries back to the feeder system that sent the transaction entries. The system can send reverse entries in the same 'transaction key' format as the transaction entries were sent from the feeder system.

One embodiment relates to a computer-implemented method of formulating reverse accounting entries for a deleted journal. The method includes ascertaining, in a computer processor operatively coupled to a memory, that a journal is to be deleted, mapping a journal entry in the journal to a transaction entry received from a feeder system, and determining an identifier key corresponding to the transaction entry received from the feeder system. The method also includes formulating a reverse accounting entry to reverse the transaction entry and sending the reverse accounting entry with the identifier key to the feeder system.

The method can also include receiving the transaction entry from the feeder system, identifying and storing the identifier key for the transaction entry, and creating the journal entry in the journal from the transaction entry before ascertaining that the journal is to be deleted.

In another embodiment, the reverse accounting entry is sent in an extensible markup language (XML) schema with a header and multiple lines. The lines may or may not have a one-to-one relationship with the accounting entry(ies) to be reversed.

Another embodiment includes determining automatically that there is an error in a transaction entry and, as a result, deleting the journal that is created from the entry. Journal entries in the deleted journal are taken care of as in the operations above.

Yet other embodiments relate to systems and machine-readable tangible storage media which employ or store instructions for the methods described above.

A further understanding of the nature and the advantages of the embodiments disclosed and suggested herein may be realized by reference to the remaining portions of the specification and the attached drawings.

BRIEF DESCRIPTION OF THE DRAWINGS

FIG. 4 illustrates a non-compound key in accordance with an embodiment.

FIG. 5 illustrates a compound key in accordance with an embodiment.

Figure 1:
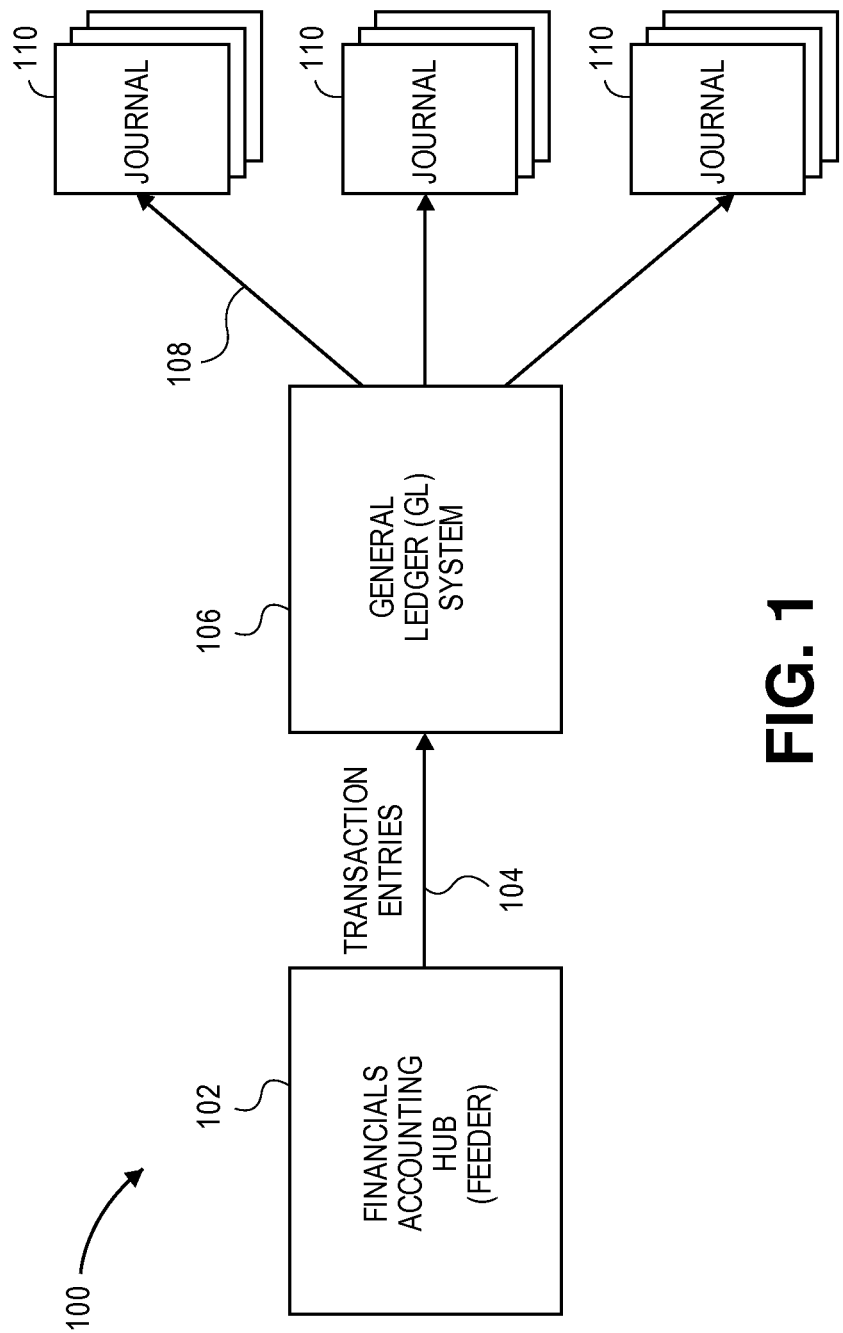
FIG. 1 illustrates a general ledger system fed by a financials account hub in accordance with an embodiment.

The figures will be used below to illustrate different embodiments in accordance with the invention. The figures are specific examples of embodiments and should not be interpreted as limiting embodiments, but rather exemplary forms and procedures.

DETAILED DESCRIPTION

Generally described is a web service embodiment that, during a deletion operation of a journal, determines the affected transaction entries and sends reverse accounting entries back to the feeder system that sent the transaction entries. The system can send reverse entries in the same 'transaction key' format as the transaction entries were sent from the feeder system.

The proposed solution provides a process and web service that efficiently and accurately allows for communication of the associated details resulting from deleting a journal in the Enterprise Resource Planning (ERP) General Ledger (GL) as well as processing the financial accounting hub reversal when it is sent back into the ERP GL.

When a journal is deleted in the ERP GL, the system automatically identifies all of the associated accounting entries that are included in the deleted journal. The system can mark each line as 'cancelled' so that subsequent runs of the journal generator process ignore those lines until the reversals have been received back from the financials accounting hub. Once the accounting lines have been marked as cancelled, generally all of the lines are aggregated into a web service message and sent to the financials accounting hub. The financials accounting hub can be the system that fed the accounting entries to the ERP GL in the first place. The financials accounting hub automatically processes the received accounting line information and creates reversal entries.

At this point in an embodiment, the accounting entries are staged for transmission to the ERP GL to net the incorrect transaction to zero. The process also marks the original transaction as 'to be processed' so that the transaction can be reprocessed through the accounting creation process. When the transaction is reprocessed through, the transaction will be validated against the information stored locally and through a validation web service for the business' chart of accounts.

It can be likely that the data that allowed the transaction to be incorrectly validated the first time will have been synchronized to the financials accounting hub. In the example of the embodiment above, the period closure would now be synchronized with the accounting hub and therefore would prevent the accounting entry from being posted back to the ERP GL until it was fixed. An accounting clerk or other responsible human operator would be notified of any validation error and could correct the transaction. When the transaction is corrected it will again be processed through create accounting to ensure that it is now valid. Once the transaction is valid, it will be sent to the ERP GL.

In addition to the corrected transaction, the reversal entries are also sent to the ERP GL. When the ERP GL receives the reversed entry, it identifies the cancelled transactions and includes them in the journal generation process. This can ensure that the cancelled transaction, along with its reversal, is processed at the same time creating a balanced transaction that nets to zero.

The process in the described embodiment automates steps throughout the process to remove manual errors. An automated computer can identify associated accounting lines within a deleted ERP journal, set the distribution status of the cancelled lines to 'cancelled,' and communicate the accounting entries associated with the deleted journal to initiate the reversal of the financial accounting hub accounting entries. The computer can also set the event status of the deleted accounting entries to 'unprocessed' so they can be corrected and revalidated.

The system can provide a way to recover from latency or discrepancy in synchronizing setup data. For example, accounting period status and chart of account values can be synchronized.

Without automatic reversal, an ERP system (GL) and sub-ledger accounting system (FAH) of previous systems are essentially two separate source of truth. This results in extra effort to reconcile and validate the two financial systems in order to satisfy regulatory requirements, such as the Sarbanes-Oxley Act.

Embodiments beneficially remove the need to manually coordinate the reversal of the sub-ledger accounting entries and the GL journals. This reduces errors and the possibility of accounting data being lost and/or unaccounted for.

Accounting transactions are often sourced from numerous systems, but ultimately they should feed into one general ledger in order to ease the accounting and audit process. The integration of these systems is sometimes critical, and the audit trail associated with these systems can be important in complying with federal and state laws.

As accounting systems become more integrated, it can be necessary to automate processes that recover from latency or discrepancies in key information stores. Some embodiments as described have validation both at the aggregation level (financials accounting hub) as well at the site of processing the ERP GL journal generator. The embodiments enhance the validation by providing a failsafe and automated recovery for those transactions that fail the ERP GL validation. The embodiments can identify all of the transactions and update the transactions not only in the ERP GL but also in the aggregating system. This can ensure that the transactions are reversed and available for correction as an automated process. Such automation removes manual intervention at an often critical point in the accounting process.

The figures will now be used to further illustrate embodiments and describe various features which can be beneficial to users.

FIG. 1 illustrates system 100, including General Ledger (GL) system 106 with transaction entries 104 fed by feeder system 102, a financials accounting hub.

A feeder system such as feeder system 102 can be embodied as a high-end set of integrated applications, such as Oracle® E-Business Suite (EBS), or it can be a variety of other sources of transaction information. Transaction entries, which may be many lines, are used by GL system 106 to create journal entries and journals 110, which are sent in structures 108. Transaction entries, or accounting entries, can be generated from a purchasing system, expense system, payable system, receivable system, point of sale system, or other systems as known in the art. For example, a set of networked cash registers in a retail store can create transaction entries. Transaction entries do not need to have a one-to-one correspondence with journal entries. For example, a transaction may debit or credit more than one account. However, the summed amounts of the debits should in standard practice equal the summed amounts of the credits in each transaction.

In a preferred embodiment, GL system 106 is a web service. The web service can communicate via the Simple Object Access Protocol (SOAP) or other protocols. The received and sent message formats can be in extensible markup language (XML) or other languages.

Figure 2:
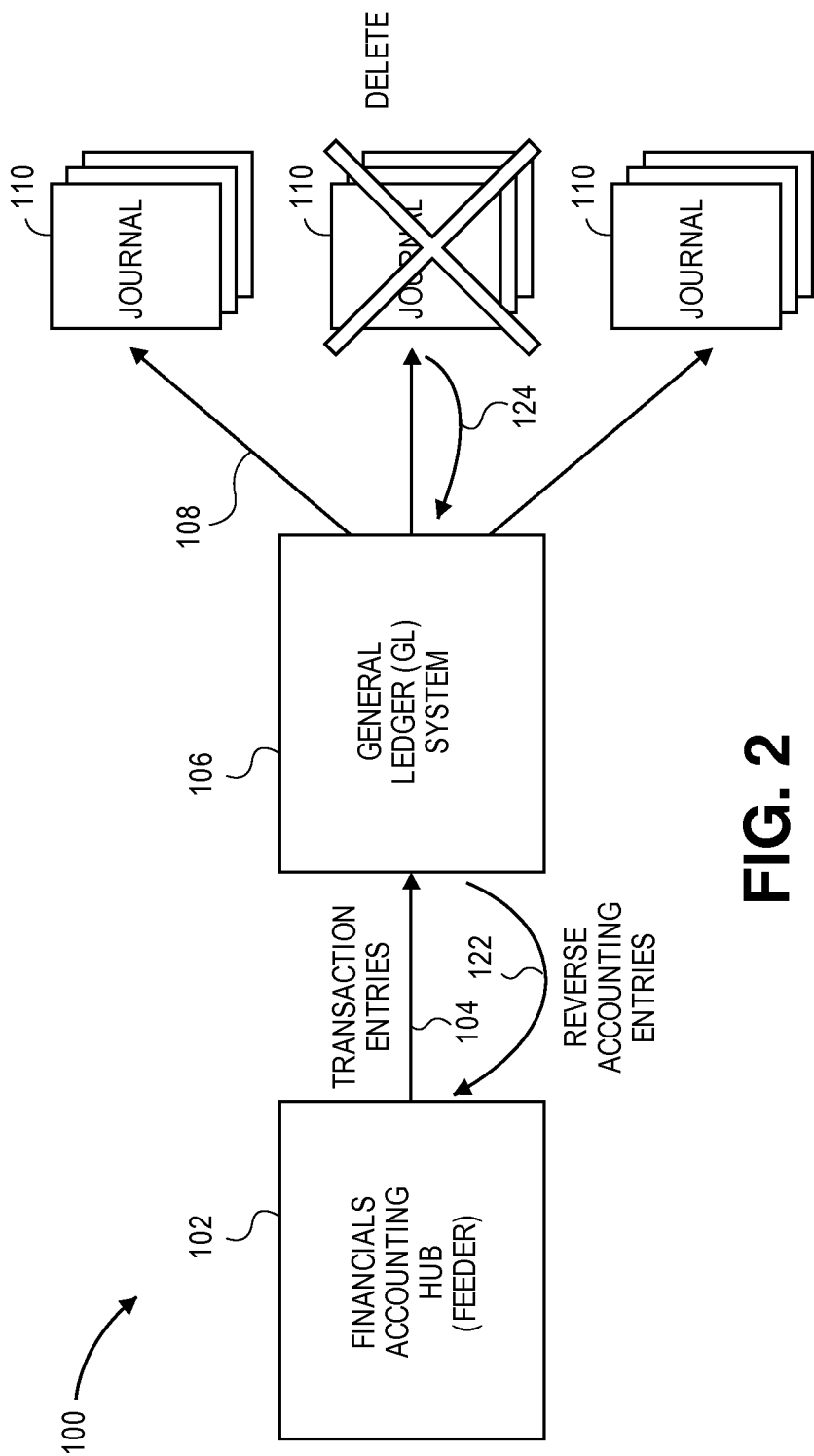
FIG. 2 illustrates the general ledger system of FIG. 1 with reverse accounting entries.

FIG. 2 illustrates system 100 of FIG. 1 in which it has been determined that a journal 110 is to be deleted. A journal may be for a store, a department in a store, or only certain cash registers for instance. A business may create various customized journals to track aspects of its operation.

A journal, such as journal 110, includes one or more journal entries. Each journal entry records information regarding a transaction, such as the date of a transaction, a debit to cash and cost of goods sold and a credit to sales and merchandise. Journal entries can be stored in a database, file structure, or storage mechanism. The journals may be implemented in hardware or software running on a specific computing device. Other embodiments use journals with journal entries and a small header; other embodiments use journals with journal entries and other data pertaining to the transactions, such as the currencies, payment methods, customer profile, and other data.

A journal may be deleted for many reasons, including those in which the journal was created in violation of business rules. For example, a department of a store may have shut down in July; however, a transaction entry erroneously reports a transaction from the department dated in August. Because no transaction should have occurred in the closed department, the resulting journal should be deleted. Another example is that of a store which accepts no cash from customers on Sundays. A transaction entry suspiciously shows a retail cash transaction occurring on a Sunday. Because no cash transactions are allowed on Sunday, the resulting journal should be deleted.

A violation of a business rule, such as one above, can automatically trigger that a journal be deleted. This can be handled within or outside of the system. A user may also determine that a journal needs to be deleted.

A business rule can be one or more conditions which can be used to compare a set of inputs to each other and/or a set of stored values. Business rules can include simple comparisons (e.g. <, >, =) or more complex linear and non-linear formulas. A business rule can be embodied in hardware or software and may be implemented on dedicated, specific machines or on general purpose computers.

The exemplary embodiment shows GL system 106 ascertaining by message 124 that a journal is to be deleted. GL system 106 then maps journal entries in the affected journal to transaction entries that had previously been sent by feeder system 102. Mapping can occur through simple identifiers or more complex pattern matches.

An identifier key, corresponding to the transaction entry received from the feeder system, is identified. Preferably, this is the same key that was sent by the feeder system with the transaction entry. This identifier key was stored by GL system 106 when the transaction entry was received.

Reverse accounting entries 122 are computed, calculated, determined, or otherwise formulated by GL system 106 in order to reverse the offending transaction entries. Formulating the reverse accounting entries can also include formatting the reverse accounting entries so that they will be compatible with and accepted by feeder system 102. For example, the reverse accounting entries can be structured in a standarized XML schema with XML elements/tags denoting metadata and data values.

Reverse accounting entries 122 are sent from GL system 106 back to feeder system 102. Feeder system 102 can then present the offending transaction to a user, flag future transactions, or re-send the transaction entries for a second try.

Figure 3:
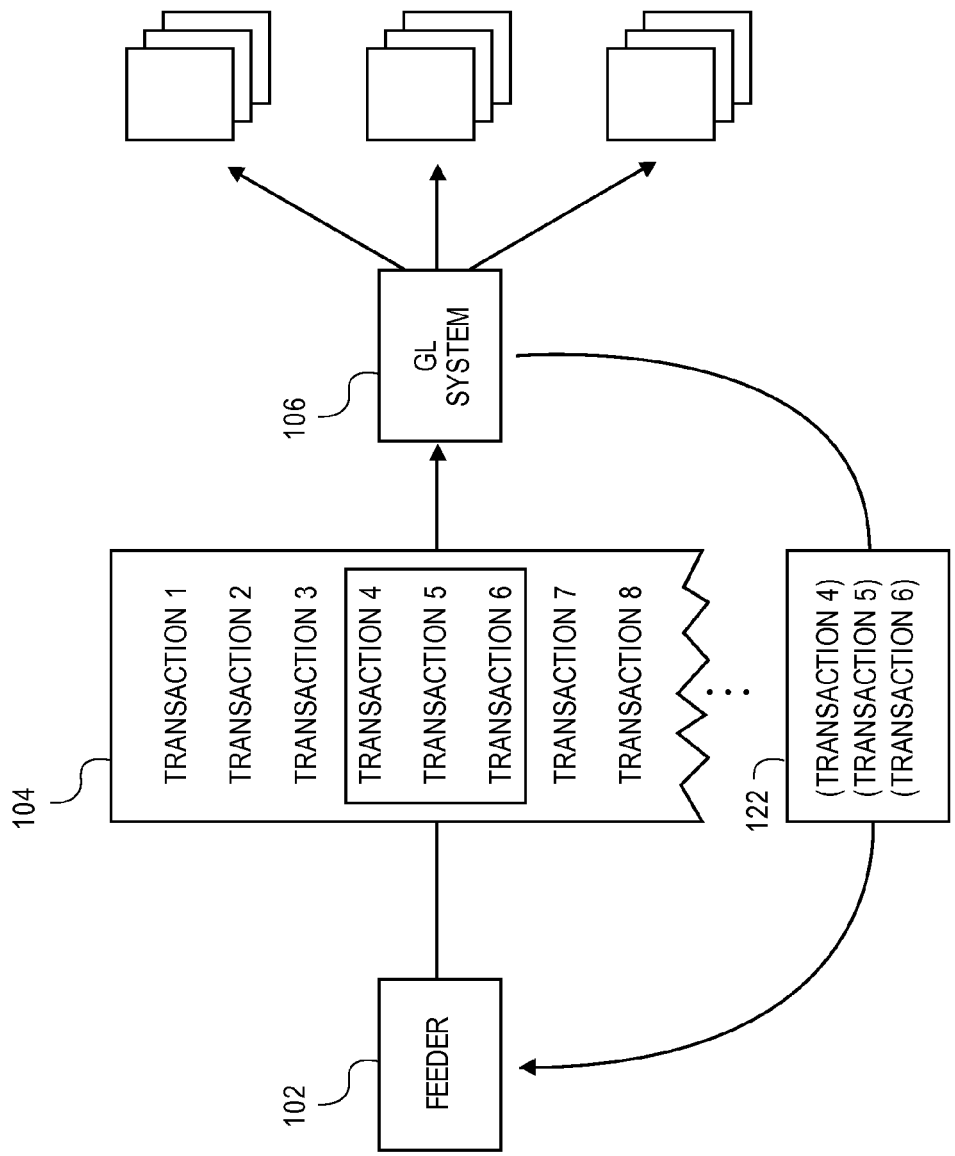
FIG. 3 illustrates accounting entries being reversed in accordance with an embodiment.

FIG. 3 illustrates accounting entries being reversed. Several of original transaction entries 104 have been mapped to journal entries under which the respective journal is to be deleted. In the exemplary embodiment, journal entries have been mapped to original Transactions 4-6. Reverse accounting entries 122 having reversal data for Transactions 4-6 are formulated and sent to feeder system 102.

FIG. 4 shows a simple transaction identifier key. In an embodiment, a feeder system sends a transaction entry with simple identifier key 402, which consists of one alphanumeric code. The transaction entry to which the key refers also includes information such as the date, amount of the transaction, whether the transaction is a debit or credit, etc. The alphanumeric code of the simple identifier key may be stored with the corresponding journal entries in the journal and later looked up to map the journal entry to the transaction entry.

FIG. 5 shows a composite identifier key. A composite identifier key, or "composite key" for shorthand, is an identifier key that requires more than one identifier, column, or piece of information in order to identify a transaction. In an embodiment, a feeder system sends a transaction entry with compound identifier key 502. In this case, the transaction is identified by a transaction type, sequence number, and date. Other forms and variations of compound identifier keys can also be used.

In an embodiment, all three pieces of information (i.e. transaction type, sequence number, and date) are used to positively identify the corresponding transaction. The three pieces of information may be kept separate or combined into one code to store with the journal entries resulting from the transaction.

Figure 6:
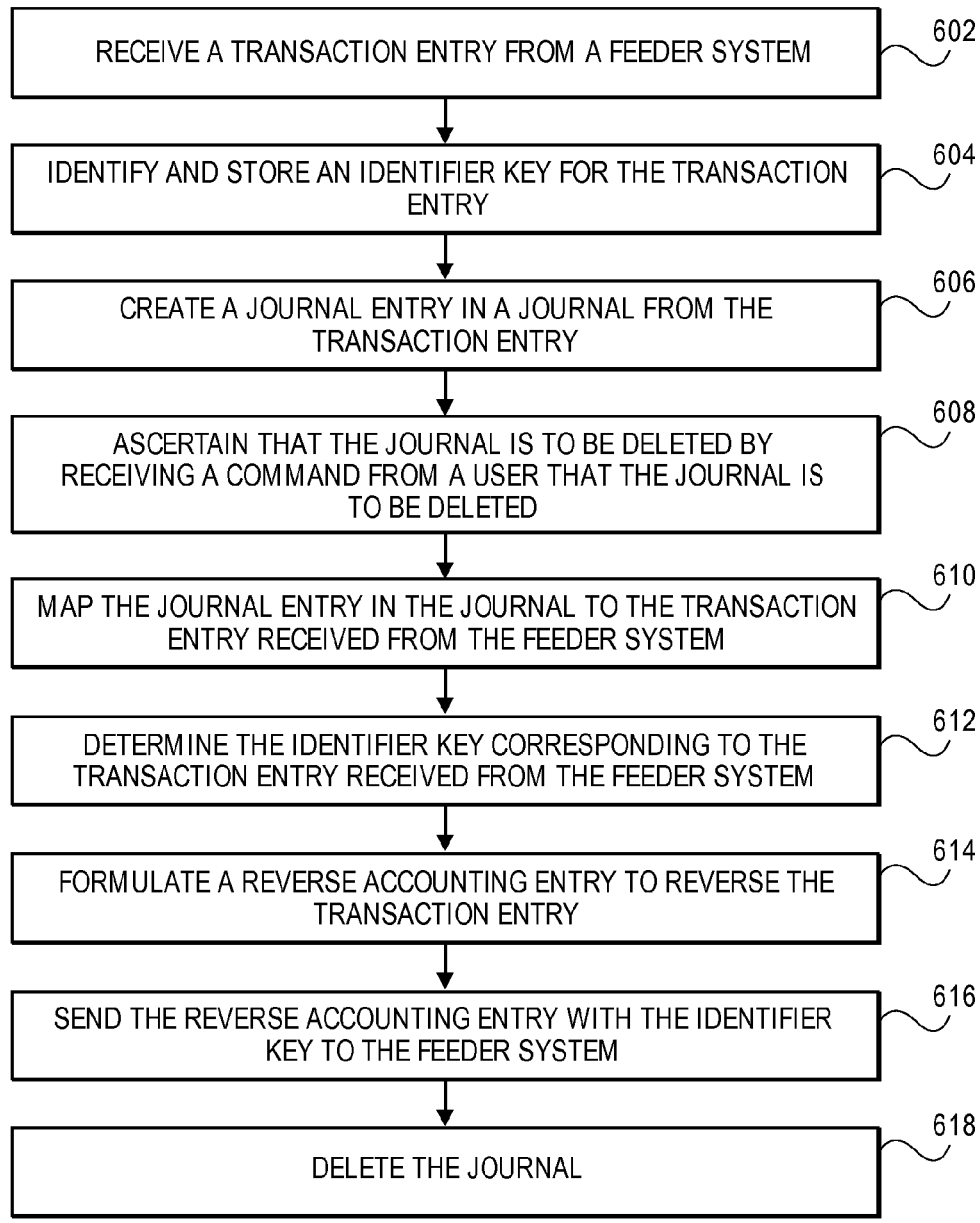
FIG. 6 is a flowchart illustrating an embodiment in accordance with the present invention.

FIG. 6 shows an example flowchart illustrating a process in accordance with one embodiment. This process can be automated in a computer or other machine. The process can be coded in software, firmware, or hard coded as machine-readable instructions and run through a processor that can implement the instructions. In operation 602, a transaction entry is received from a feeder system. In operation 604, an identifier key, such as a simple or compound key, is identified and stored for the transaction entry. In operation 606, a journal entry is created in a journal from the transaction entry. In operation 608, it is ascertained that the journal is to be deleted (or has already been deleted). A command from a user is received instructing that the journal is to be deleted. Other embodiments include systems which automatically determine whether a journal is to be deleted. In operation 610, the journal entry in the journal is mapped to the transaction entry received from the feeder system. In operation 612, the identifier key corresponding to the transaction entry received from the feeder system is determined. In operation 614, a reverse accounting entry is formulated to reverse the transaction entry. In operation 616, the reverse accounting entry is sent with the identifier key to the feeder system. In operation 618, the journal is deleted (if it has not already been deleted). These operations may be performed in the sequence given above or in different orders as applicable.

Figure 7:
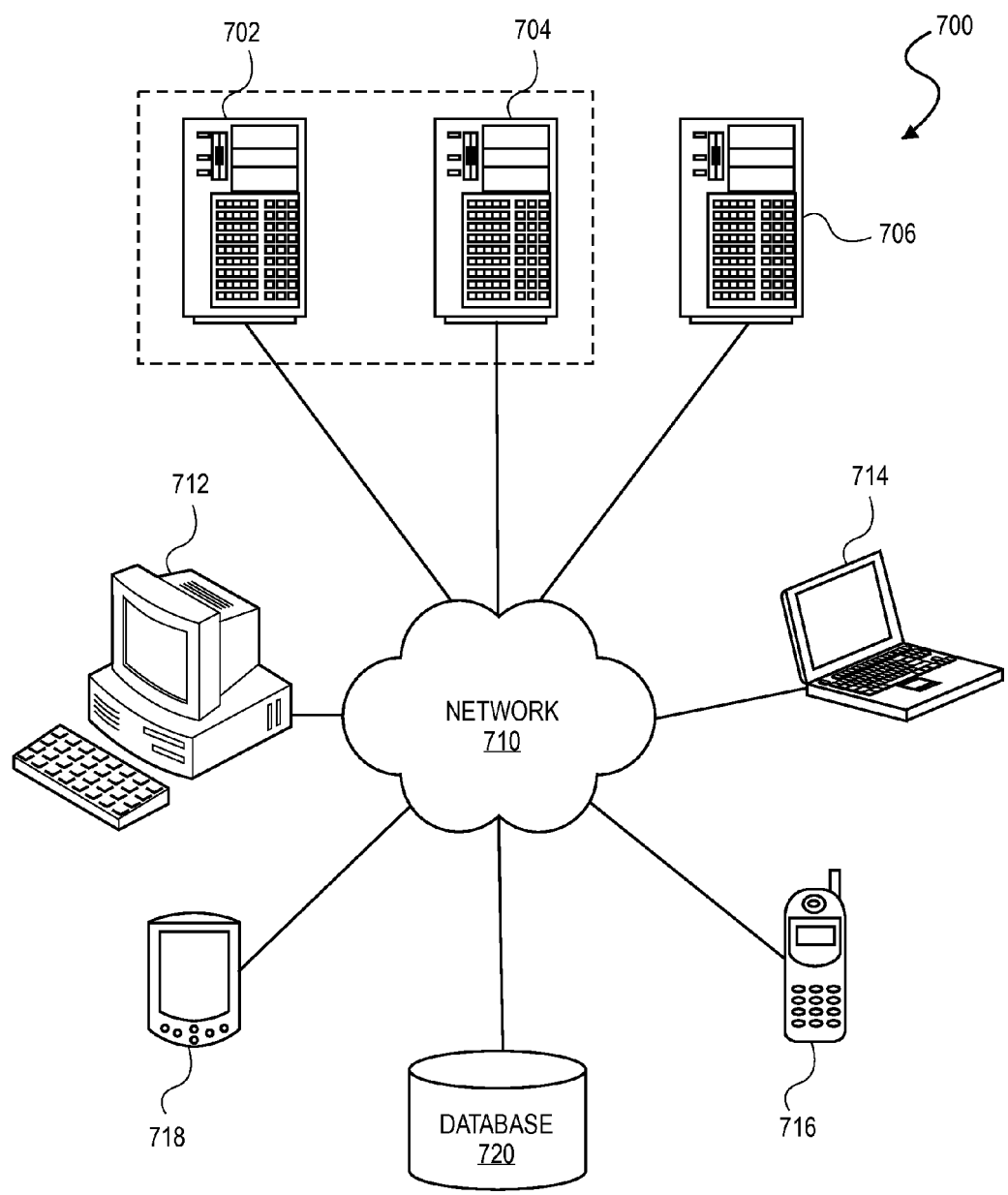
FIG. 7 illustrates components of a computer network that can be used in accordance with one embodiment.

FIG. 7 is a block diagram illustrating components of an exemplary operating environment in which various embodiments of the present invention may be implemented. The system 700 can include one or more user computers, computing devices, or processing devices 712, 714, 716, 718, which can be used to operate a client, such as a dedicated application, web browser, etc. The user computers 712, 714, 716, 718 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 712, 714, 716, 718 may also have any of a variety of applications, including one or more development systems, database client and/or server applications, and Web browser applications. Alternatively, the user computers 712, 714, 716, 718 may be any other electronic device, such as a thin-client computer, Internet-enabled gaming system, and/or personal messaging device, capable of communicating via a network (e.g., the network 710 described below) and/or displaying and navigating Web pages or other types of electronic documents. Although the exemplary system 700 is shown with four user computers, any number of user computers may be supported.

In most embodiments, the system 700 includes some type of network 710. The network may can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2 G, 2.5 G, 3 G, 4 G, Wimax, WiFi, CDMA 2000, WCDMA, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 706) may be dedicated to running applications, such as a business application, a Web server, application server, etc. Such servers may be used to process requests from user computers 712, 714, 716, 718. The applications can also include any number of applications for controlling access to resources of the servers 702, 704, 706.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 712, 714, 716, 718. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 712, 714, 716, 718.

The system 700 may also include one or more databases 720. The database(s) 720 may reside in a variety of locations. By way of example, a database 720 may reside on a storage medium local to (and/or resident in) one or more of the computers 702, 704, 706, 712, 714, 716, 718. Alternatively, it may be remote from any or all of the computers 702, 704, 706, 712, 714, 716, 718, and/or in communication (e.g., via the network 710) with one or more of these. In a particular set of embodiments, the database 720 may reside in a storage-area network ("SAN") familiar to those skilled in the art. Similarly, any necessary files for performing the functions attributed to the computers 702, 704, 706, 712, 714, 716, 718 may be stored locally on the respective computer and/or remotely, as appropriate. In one set of embodiments, the database 720 may be a relational database, such as Oracle 10g, that is adapted to store, update, and retrieve data in response to SQL-formatted commands.

Figure 8:
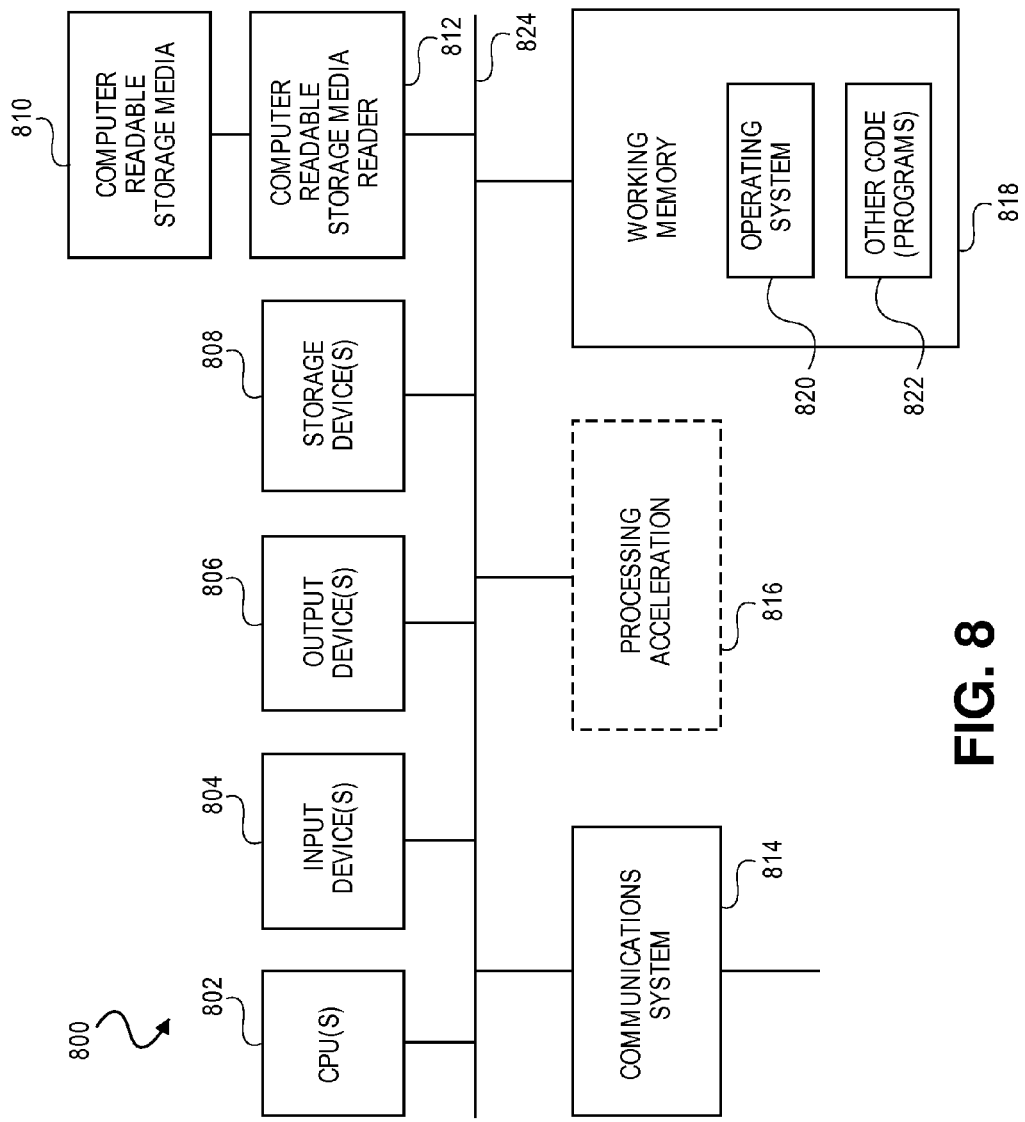
FIG. 8 illustrates components of a computerized device that can be used in accordance with one embodiment.

FIG. 8 illustrates an exemplary computer system 800, in which various embodiments of the present invention may be implemented. The system 800 may be used to implement any of the computer systems described above. The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 812, a communications system 814 (e.g., a modem, a network card (wireless or wired), an infra-red communication device, etc.), and working memory 818, which may include RAM and ROM devices as described above. In some embodiments, the computer system 800 may also include a processing acceleration unit 816, which can include a digital signal processor DSP, a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information. The communications system 814 may permit data to be exchanged with the network and/or any other computer described above with respect to the system 800.

The computer system 800 may also comprise software elements, shown as being currently located within a working memory 818, including an operating system 820 and/or other code 822, such as an application program (which may be a client application, Web browser, mid-tier application, RDBMS, etc.). It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method of formulating reverse accounting entries for a deleted journal, the method comprising:
   receiving a command, in at least one computer processor operatively coupled to a memory, that a journal is to be deleted;
   mapping, by the at least one computer processor operatively coupled with the memory, a journal entry in the journal to be deleted to a transaction entry received from a feeder system;
   determining, by the at least one computer processor operatively coupled with the memory, an identifier key corresponding to the transaction entry received from the feeder system;
   formulating, by the at least one computer processor operatively coupled with the memory, a reverse accounting entry in a web service message to reverse the transaction entry; and
   sending, by the at least one computer processor operatively coupled with the memory, the reverse accounting entry with the identifier key corresponding to the transaction entry received from the feeder system in the web service message to the feeder system, wherein the web service message aggregates other reverse accounting entries for other journal entries in the journal to be deleted.

2. The method of claim 1 further comprising:
   receiving the transaction entry from the feeder system;
   identifying and storing the identifier key for the transaction entry; and
   creating the journal entry in the journal from the transaction entry.

3. The method of claim 1 further comprising:
   deleting the journal.

4. The method of claim 1 wherein the sending is from a web service.

5. The method of claim 1 wherein the identifier key is a composite key.

6. The method of claim 1 wherein the command is from a user that the journal is to be deleted.

7. The method of claim 1 wherein the sending of the reverse accounting entry with the identifier key conforms to an extensible markup language (XML) schema.

8. The method of claim 7 wherein the XML schema includes a header and multiple transaction lines.

9. The method of claim 1 wherein the command that the journal is to be deleted includes determining an error in the journal based on a business rule.

10. The method of claim 1 wherein the receiving, mapping, determining, formulating, and sending are conducted in the order shown.

11. The method of claim 1 wherein the receiving, mapping, determining, formulating, and sending are all performed by the computer processor.

12. A non-transitory machine-readable storable medium embodying information indicative of instructions for causing one or more machines to perform operations for formulating reverse accounting entries for a deleted journal, the operations comprising:
   receiving a command, in at least one computer processor operatively coupled to a memory, that a journal is to be deleted;
   mapping, by the at least one computer processor operatively coupled with the memory, a journal entry in the journal to be deleted to a transaction entry received from a feeder system;
   determining, by the at least one computer processor operatively coupled with the memory, an identifier key corresponding to the transaction entry received from the feeder system;
   formulating, by the at least one computer processor operatively coupled with the memory, a reverse accounting entry in a web service message to reverse the transaction entry; and sending, by the at least one computer processor operatively coupled with the memory, the reverse accounting entry with the identifier key corresponding to the transaction entry received from the feeder system in the web service message to the feeder system, wherein the web service message aggregates other reverse accounting entries for other journal entries in the journal to be deleted.

13. A computer system for formulating reverse accounting entries for a deleted journal, the computer system comprising:

at least one computer processor;

a non-transitory memory operatively coupled to the at least one processor, the processor enabled to execute program code including:

program code for receiving a command, in the at least one computer processor operatively coupled to the memory, that a journal is to be deleted;

program code for mapping, by the at least one computer processor operatively coupled with the memory, a journal entry in the journal to be deleted to a transaction entry received from a feeder system;

program code for determining, by the at least one computer processor operatively coupled with the memory, an identifier key corresponding to the transaction entry received from the feeder system;

program code for formulating, by the at least one computer processor operatively coupled with the memory, a reverse accounting entry in a web service message to reverse the transaction entry; and program code for sending, by the at least one computer processor operatively coupled with the memory, the reverse accounting entry with the identifier key corresponding to the transaction entry received from the feeder system in the web service message to the feeder system, wherein the web service message aggregates other reverse accounting entries for other journal entries in the journal to be deleted.

14. The method of claim 1 wherein determining the identifier key includes:

looking up an identifier key that was sent with the respective transaction entry from the feeder system.

15. The method of claim 1 further comprising:

mapping all journal entries of a journal to their respective transaction entries;

looking up identifier keys corresponding to the respective transaction entries received from their respective one or more feeder systems;

formulating reverse accounting entries to reverse the transaction entries; and sending the reverse accounting entries with the respective identifier keys to the one or more feeder systems.

16. The method of claim 15 further comprising:

aggregating into a web service message the reverse accounting entries and sending to the one or more feeder systems.

17. The method of claim 1 further comprising:

determining that the journal was created in violation of a business rule restricting transactions to specified dates; and automatically triggering that the journal be deleted based upon the determination that the business rule was violated.

18. The method of claim 1 further comprising:

formulating the reverse accounting entry in a same format, with a same transaction key, as was received from a feeder system that created the transaction entry.

19. The method of claim 1 further comprising:

marking the journal entry as cancelled.

20. The method of claim 1 wherein the command that the journal is to be deleted is automatically triggered by a business rule on a computer system.

* * * * *

UNITED STATES PATENT AND TRADEMARK OFFICE
CERTIFICATE OF CORRECTION

PATENT NO. : 9,208,527 B2
APPLICATION NO. : 12/697509
DATED : December 8, 2015
INVENTOR(S) : Tam et al.

Page 1 of 1

It is certified that error appears in the above-identified patent and that said Letters Patent is hereby corrected as shown below:

In the specification

In column 6, line 27, delete "standarized" and insert -- standardized --, therefor.

Signed and Sealed this
Twenty-third Day of August, 2016

Michelle K. Lee
*Director of the United States Patent and Trademark Office*